United States Patent [19]

Treves et al.

[11] Patent Number: 5,537,282

[45] Date of Patent: Jul. 16, 1996

[54] DATA STORAGE DISK HAVING IMPROVED TRACKING CAPABILITY

[76] Inventors: David Treves, 479 Ferne Ave., Palo Alto, Calif. 94306; Seiji Yonezawa, 2-6-11 Mejirodai, Hachioji, Tokyo, Japan

[21] Appl. No.: 275,901

[22] Filed: Jul. 15, 1994

[51] Int. Cl.$^6$ ................................ G11B 5/82; G11B 5/58; G11B 5/596

[52] U.S. Cl. .................. 360/135; 360/77.01; 360/77.02; 360/77.07

[58] Field of Search .......................... 360/135, 76, 77.01, 360/77.02, 77.07, 77.08; 369/275.1

[56] References Cited

U.S. PATENT DOCUMENTS

| | | | |
|---|---|---|---|
| 4,364,118 | 12/1982 | Maeda et al. | 369/49 |
| 4,746,580 | 5/1988 | Bishop et al. | 428/557 |
| 4,769,802 | 9/1988 | Tatsuguchi | 369/46 |
| 4,856,108 | 8/1989 | Tinet | 369/46 |
| 4,935,278 | 6/1990 | Krounbi et al. | 428/64 |
| 4,961,123 | 10/1990 | Williams et al. | 360/131 |
| 5,296,995 | 3/1994 | Yonezawa et al. | 360/135 |
| 5,325,244 | 6/1994 | Takano et al. | 360/77.03 |
| 5,402,278 | 3/1995 | Morita | 360/135 |
| 5,402,411 | 3/1995 | Maeda et al. | 369/275.1 |

OTHER PUBLICATIONS

"Demonstration of Track Following Technic Based On Discrete Track Media", K. Watanabe et al., Digest of Intermag—Stockholm, Sweden, 1993, 1 pg.

"Discrete–Track Magnetic Disk Using Embossed Substrate", T. Ishida et al., IEICE Trans. Fundamentals, vol. E76–A, No. 7, Jul. 1993.

*Primary Examiner*—John H. Wolff
*Assistant Examiner*—Adriana Giordana
*Attorney, Agent, or Firm*—Skjerven, Morrill, MacPherson, Franklin & Friel

[57] ABSTRACT

In the present invention a magnetic data storage includes disk recesses formed in the magnetic layer. The recesses are located in pairs on opposite sides of the data tracks, and the disk is initialized by applying a magnetic field perpendicular and parallel to the surface of the disk, thereby forming positive magnetic poles at respective edges of the recesses. The read/write head generates a signal as it passes over the pairs of recesses, and this signal is used to adjust the position of the head with respect to the data track. The recesses may advantageously be arranged in a stair step pattern which results in a signal having the same sequential characteristics for adjacent data tracks. The spacing between the recesses may be used to represent ROM data or header information, such as track addresses or synchronization marks.

28 Claims, 5 Drawing Sheets

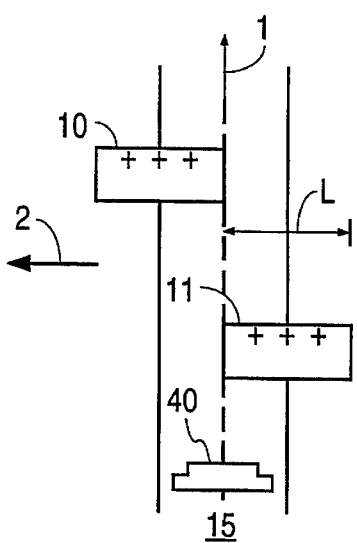
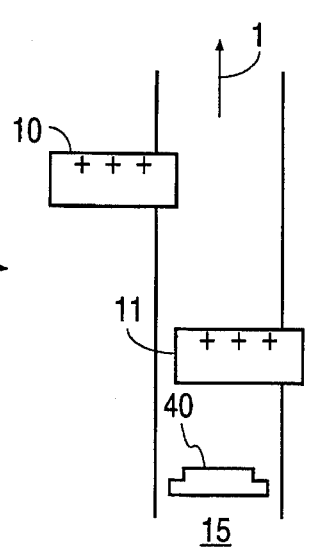
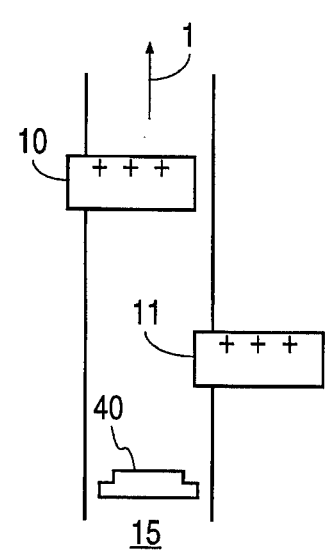
FIG. 3a     FIG. 3b     FIG. 3c
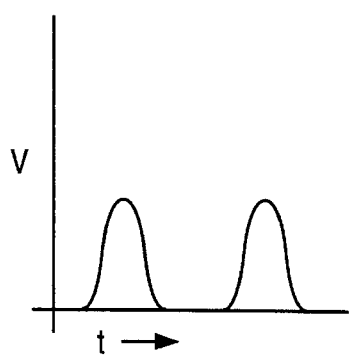
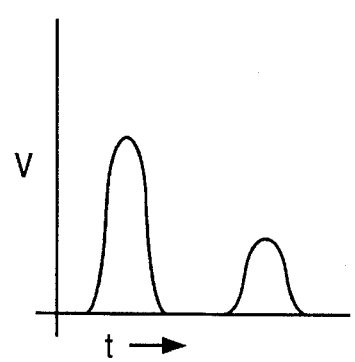
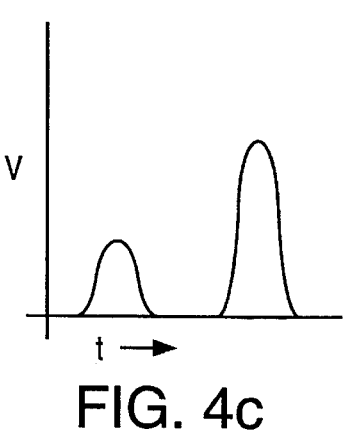
FIG. 4a     FIG. 4b     FIG. 4c

DATA STORAGE DISK HAVING IMPROVED TRACKING CAPABILITY

BACKGROUND OF THE INVENTION

1. Field of the Invention

This invention relates to magnetic data storage disks and, in particular, to a technique for improving the tracking of a magnetic head while it is writing or reading data on the disk.

2. Description of the Related Art

Magnetic disks are used by computers for storing data. Conventional magnetic disks are made by sputtering a magnetic layer of a material such as a Pt/Co alloy onto an aluminum or glass disk substrate. Before the disk may be used, it is necessary to initialize the magnetic layer to record track addresses and synchronization marks. A magnetic head is then used to write and read data on the disk in circular tracks.

The initialization process is usually performed on each disk individually using a magnetic servo writing machine. As the track density of the disk (i.e., the number of tracks per unit of radial distance) is increased, this process becomes more and more time consuming. Moreover, highly accurate mechanical and environmental tolerances must be attained to produce disks with high track densities. Both of these factors in turn tend to increase the cost of the disks.

An alternative to the extremely accurate but expensive initialization process now used for high track density disks would overcome these problems and help to reduce the cost of the disks.

The prior art attempted to solve this problem by several techniques which use markers of various types to locate the position of the track on the disk. In the method described in U.S. Pat. No. 4,961,123, for example, a plurality of concentric grooves are formed on the surface of the disk. A light beam is focused on the disk. The focused beam is optically diffracted by the grooves, and a push-pull tracking signal is obtained from the diffracted beam pattern, as described in U.S. Pat. No. 4,856,108. This arrangement is less than satisfactory because the inclusion of an optical head significantly increases the size and cost of the apparatus.

The methods described in U.S. Pat. No. 4,746,580 and U.S. Pat. No. 4,935,278 involve removing a portion of the magnetic recording layer by ion milling or reactive ion etching to form markings which can be read by a magnetic head. This process stains the disk surface and may cause head crashes during the reading or writing of data on the disk.

SUMMARY OF THE INVENTION

In accordance with this invention, a pattern of discrete recesses or pits are formed in a substrate to be used in the fabrication of a magnetic data storage disk, prior to the deposition of the magnetic recording layer. In the preferred embodiment, the recesses viewed from above are approximately rectangular in shape, with a larger dimension aligned in a radial direction on the disk. A magnetic recording layer is then deposited on the surface of the substrate. The magnetic recording layer generally follows the contours of the recesses, and thus corresponding recesses appear in the magnetic recording layer.

The disk is initialized by applying a magnetic field parallel and/or perpendicular to the surface of the disk. The magnetic field parallel to the surface of the disk causes portions of the magnetic layer adjacent the recesses to become magnetized in a direction parallel to the surface of the disk, and the magnetic field perpendicular to the surface of the disk causes portions of the magnetic layer on walls of the recesses to become magnetized in a direction parallel to the side walls of the recesses. This in turn causes magnetic poles to be formed at the edges of the recesses. These poles induce a magnetic flux and cause a signal to be generated in a magnetic head as it flies over the surface of the disk.

The recesses may be formed in pairs, with the recesses in each pair being located at different azimuthal positions on opposite sides of an intended data track. As the head flies over a pair of recesses, successive signals are induced in the head. The relative strength of the signals is detected, and a difference (error) signal is used to cause an actuator motor or other mechanism to adjust the position of the head. In one exemplary embodiment, the recesses are formed symmetrically about the center of the intended data track, and the difference signal is therefore zero when the head is on track. In another exemplary embodiment, the recesses are formed in a "stair step" configuration, in which the error signals for adjacent tracks are in the same sequence if the head is misaligned in a given direction.

According to another aspect of the invention, recesses as described above are formed in selected patterns which constitute read only memory (ROM) data or ROM header information, such as addresses or synchronization marks. Prerecording ROM data or header information specific to a computer system with recesses makes it unnecessary to read the data into the disk by conventional techniques.

BRIEF DESCRIPTION OF THE DRAWINGS

FIG. 3a illustrates in plan view the position of the read/write head in relation to a pair of recesses when it is properly centered. FIG. 3b illustrates the position of the head when it is offset to the right, and FIG. 3c illustrates the position of the head when it is offset to the left.

FIGS. 4a–4c illustrate the signals generated by a read/write head when it is in the positions shown in FIGS. 3a–3c, respectively.

FIG. 8b illustrates the summation of the laser beam in the device shown in FIG. 8a.

DESCRIPTION OF THE INVENTION

Figure 1:
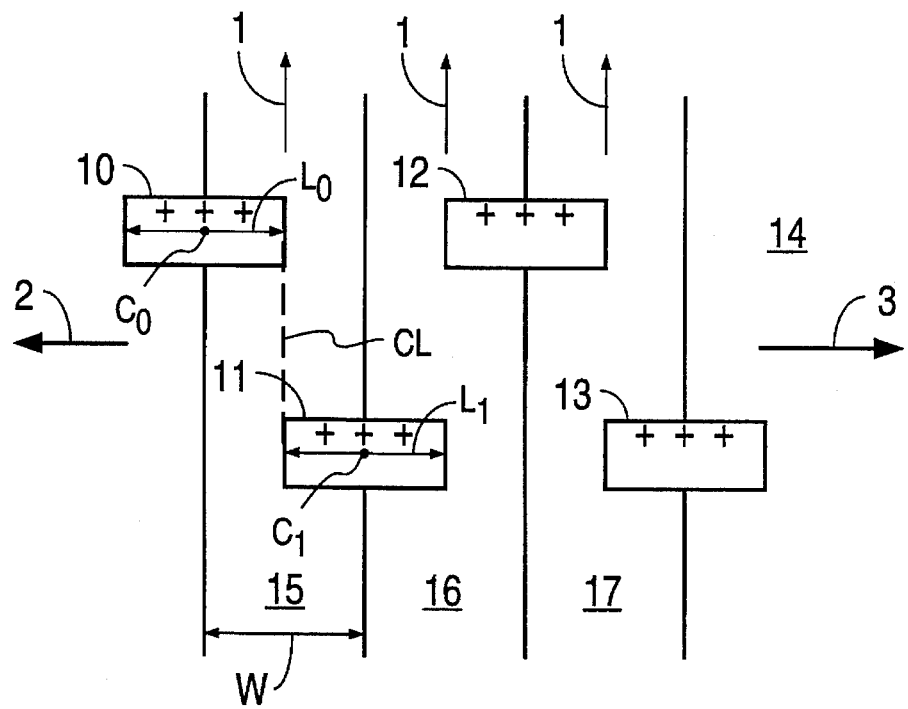
FIG. 1 illustrates a plan view of a magnetic disk showing recesses formed in accordance with this invention.

FIG. 1 illustrates a plan view of recesses 10, 11, and 13 formed on the surface of a disk 14 according to one embodiment of the invention. Each of recesses 10, 11, 12 and 13 is rectangular, and has a longitudinal axis which coincides with a radius of disk 14. The intended locations of prospective data tracks on the surface of disk 14 are represented by the reference numerals 15, 16 and 17. The centerline of data track 15 is designated CL.

Figure 2:
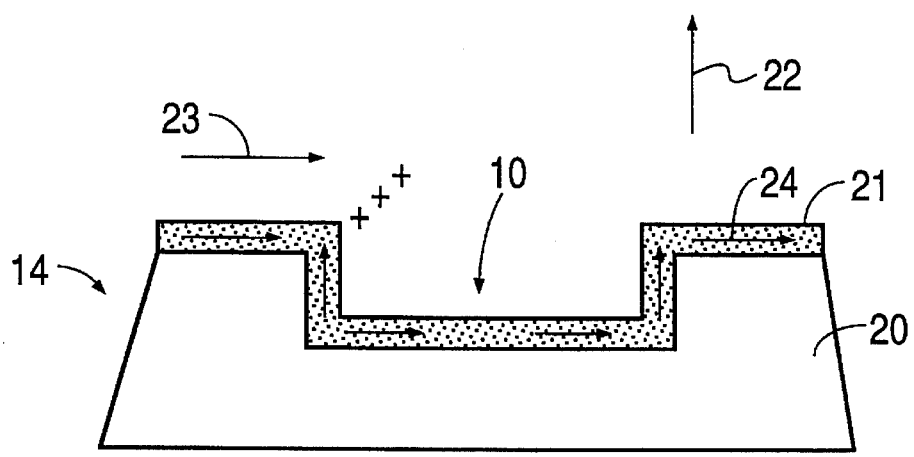
FIG. 2 illustrates a cross-sectional view of a recess taken along a line parallel to the direction of the data tracks.

FIG. 2 illustrates a cross-sectional view of recess 10 taken in a direction parallel to centerline CL. A depression is formed in a substrate 20 of disk 14, which is typically made of aluminum or glass. Thereafter, a magnetic layer 21, which typically includes a plurality of sublayers, is applied to the top surface of substrate 20. As indicated, magnetic layer 21 conforms generally to the shape of the depression formed in substrate 20, thus producing recess 10. Magnetic layer 21 is typically about 0.02–0.07 µm thick. The recess may have a depth of from 0.03 µm to 0.5 µm, for example, a length in the radial direction of from 1 µm to 20 µm, and a width in the azimuthal (rotational) direction of from 0.5 µm to 6.0 µm. In most cases, there will be additional layers covering magnetic layer 21 (e.g., a protective overcoat) that are not shown in FIG. 2. Recesses 11–13 are identical to recess 10.

Disk 14 is initialized by subjecting it, first, to a magnetic field perpendicular to the surface of disk 14, in the direction of arrow 22 shown in FIG. 2. This magnetic field may be created with an electromagnet positioned adjacent the surface of disk 14, with the magnetic lines of force running perpendicular to the surface. This creates an upward magnetic orientation in the portion of magnetic layer 21 which forms the side walls of recess 10. Next, the surface of disk 14 is subjected to a magnetic field parallel to the surface of disk 14 (in the direction of arrow 23 shown in FIG. 2), which creates a magnetic orientation in the direction indicated by arrow 24 in magnetic layer 21. This is advantageously done with a DC "write" current in the magnetic read/write head. The result of the initialization process is to create a positive magnetic pole at the left edge of recess 10, where the upward magnetic direction in the wall of recess 10 converges with the rightward direction of magnetism in the horizontal portion of magnetic layer 21. The positive magnetic poles at the edges of recesses 10–14 are designed by +'s in FIGS. 1 and 2.

As is apparent from FIG. 1, recesses 10 and 11 are offset symmetrically with respect to the centerline of track 15. Similarly, recesses 11 and 12 are symmetrical about the centerline of track 16, and recesses 12 and 13 are symmetrical about the centerline of track 17. FIGS. 3a–3c illustrate how recesses 10 and 11 are used to center a read/write head, represented by a pair of pole-tips 40, such that track 15 is formed in the correct position. As is apparent, pole-tips 40 first pass over recess 11 and then over recess 10. Thus, the head receives two signals in succession from the positive magnetic poles along the transverse edges of recesses 10 and 11. In FIG. 3a, pole-tips 40 pass over essentially equal segments of recesses 10 and 11, and therefore the signals are of equal magnitude. In FIG. 3b, where pole-tips 40 are offset to the right from the desired position, a larger segment of pole-tips 40 pass over recess 11 than over recess 10, and therefore the signal generated as pole-tips 40 pass over recess 11 is greater than the signal generated when pole-tips 40 pass over recess 10. In FIG. 3c, where pole-tips 40 are offset to the left, a larger segment of pole-tips 40 pass over recess 10 than over recess 11, and therefore the signal generated when pole-tips 40 pass over recess 11 is smaller than the signal generated when pole-tips 40 pass over recess 10. The signals generated by pole-tips 40 in the positions shown in FIGS. 3a–3c are illustrated in FIGS. 4a–4c, respectively, wherein the longitudinal axis is time and the vertical axis represents the signal (voltage) received from pole-tips 40.

The signals so generated are compared and a difference (error) signal is formed. The error signal is used to drive a mechanism (typically the actuator motor) which moves the head to the correct position. The circuitry and mechanisms for bringing about this adjustment are conventional and are not a part of this invention.

Referring again to FIG. 1, it can be seen that recess 10 has a longitudinal axis $L_0$ and recess 11 has a longitudinal axis $L_1$ in the radial direction, longitudinal axes $L_0$ and $L_1$ having centerpoints $C_O$ and $C_1$, respectively. In the preferred embodiment, $L_0=L_1$. It will be noted that centerpoints $C_O$ and $C_1$ are located at different distances from the center of the disk. More particularly, in this embodiment, centerpoint $C_O$ of recess 10 is located on one side of centerline CL of data track 15 and the centerpoint $C_1$ of recess 11 is located on the other side of centerline CL. While the edges of recesses 10 and 11 are shown as roughly coinciding with centerline CL, this is not necessary. Recesses 10 and 11 may overlap or not even touch centerline CL. Recesses 10 and 11 are shown as elongated in the radial direction in FIG. 1, but this need not be the case.

In the embodiment illustrated in FIG. 1, the sequence of signals from the recess pairs in the odd-numbered tracks (15,17) are opposite to those from the recess pairs in the even-numbered tracks (16). For example, if the head is over track 15, a first signal is generated as the head passes over recess 11, and a second signal is generated as the head passes over recess 10. Assuming that the head is tracking too far to the left, the head will pass over a larger portion of recess 10 than recess 11. As described above, this means that the first signal (as the head passes over recess 11) will be smaller than the second signal (as the head passes over recess 10). Conversely, if the head is over track 16, the first signal will be larger than the second signal if the head is tracking too far to the left.

Thus, in the embodiment of FIG. 1 there must be some way of detecting whether the head is flying over an odd-numbered track or an even-numbered track. There are a number of techniques available for accomplishing this detection. For example, the track address may be used for the purpose, or additional markers may be placed in the tracks to indicate whether they are odd-numbered or even numbered.

Figure 5:
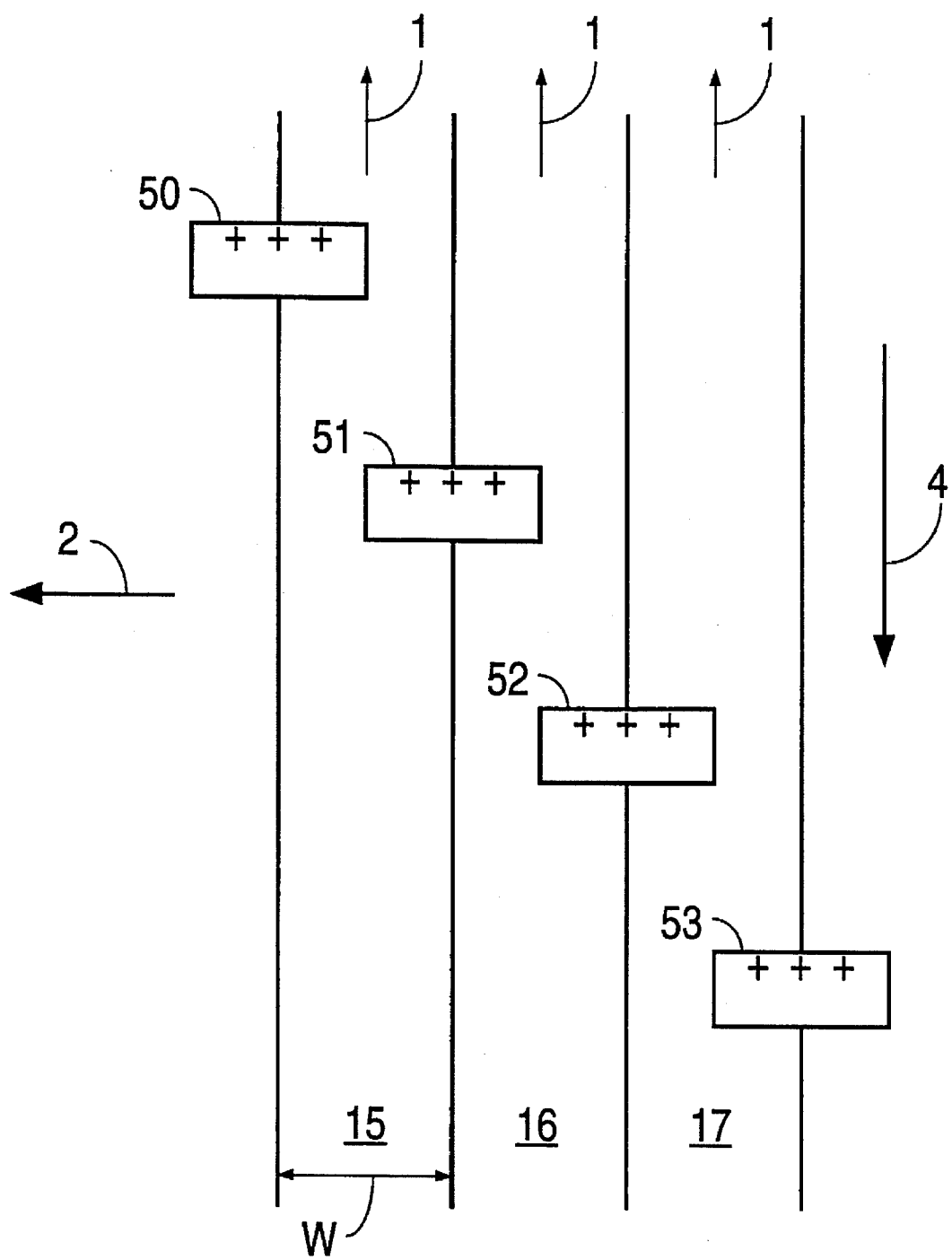
FIG. 5 illustrates a plan view of the recesses configured in a "stair step" arrangement.

The need to identify odd- and even-numbered tracks is avoided in the embodiment illustrated in FIG. 5, wherein recesses 51, 52, 53 and 54 are arranged in a "stair step" configuration. In this configuration, the radial distance of the recesses from the center of the disk either uniformly increases or uniformly decreases as the azimuthal (angular) position of the recesses changes in a particular direction. In FIG. 5, for example, the radial distance to the center of the disk increases as the azimuthal position moves downward. With this stair step configuration, if the head is too far to the left in any track (i.e., displaced toward the center of the disk), the first signal will always be smaller than the second signal. This means that, in track 15, the signal generated as the head passes over recess 51 will be smaller than the signal generated as the head passes over recess 50; in track 16, the signal generated as the head passes over recess 52 will be smaller than the signal generated as the head passes over recess 51; etc.

Figure 6:
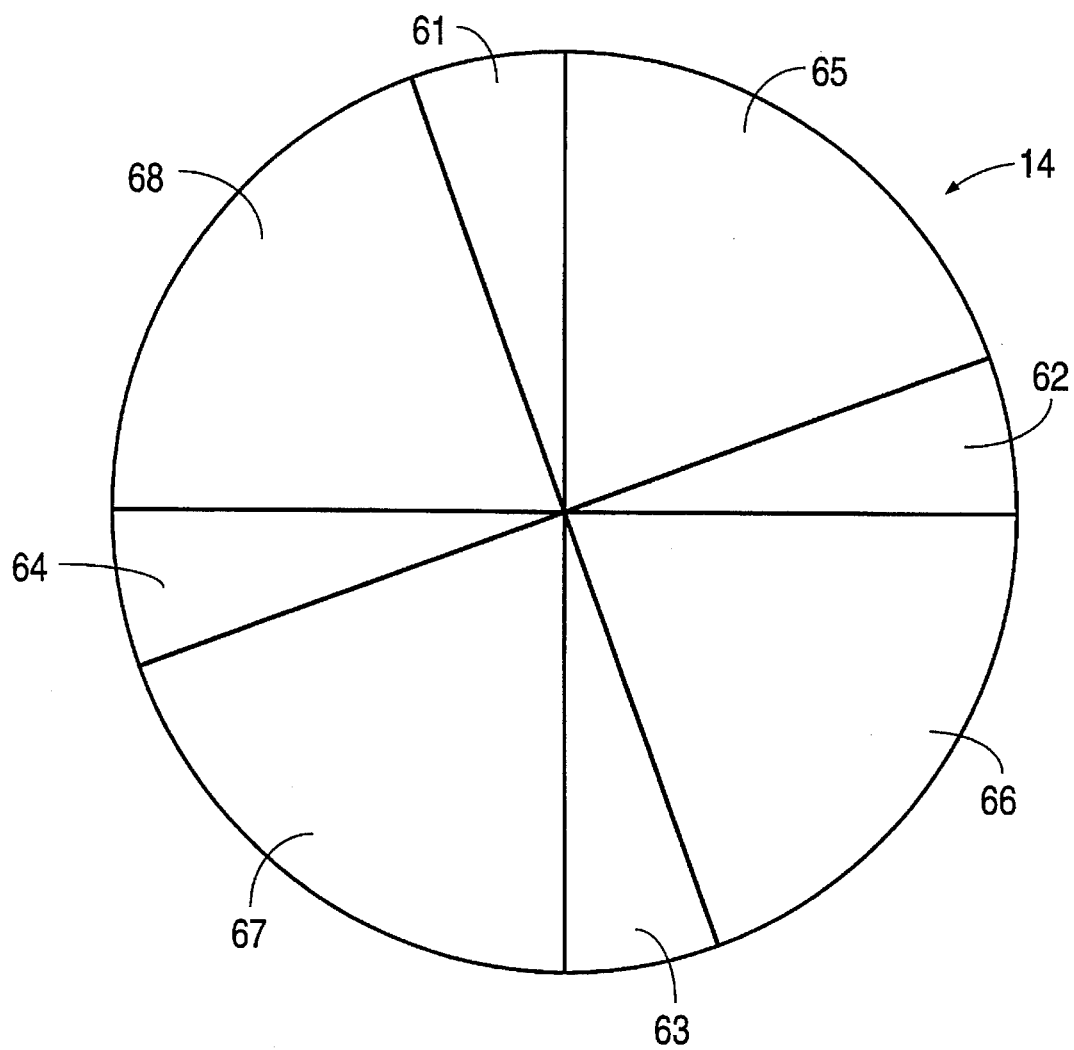
FIG. 6 illustrates a plan view of a conventional disk, showing header areas and data areas.

It will be appreciated that the embodiments of FIGS. 1 and 5 are only exemplary, and the recesses may be placed in a wide variety of patterns on the surface of the disk. The data tracks are normally in the form of concentric circles or a spiral. It has been found that 50–3000 recesses per track for each 360° of rotation are acceptable. The recesses may be placed both in sectors of the disk which do not contain magnetically stored data and in sections of the disk which do contain data. The software which controls the read/write head is timed so that it knows when to expect a pair of recesses to check the alignment of the head. FIG. 6 illustrates how disk 14 might be partitioned into "header" sectors 61, 62, 63 and 64, which contain track addresses and tracking recesses such as are shown in FIGS. 1 and 5, and data sectors 65, 66, 67 and 68, which contain magnetically recorded data.

Figure 7:
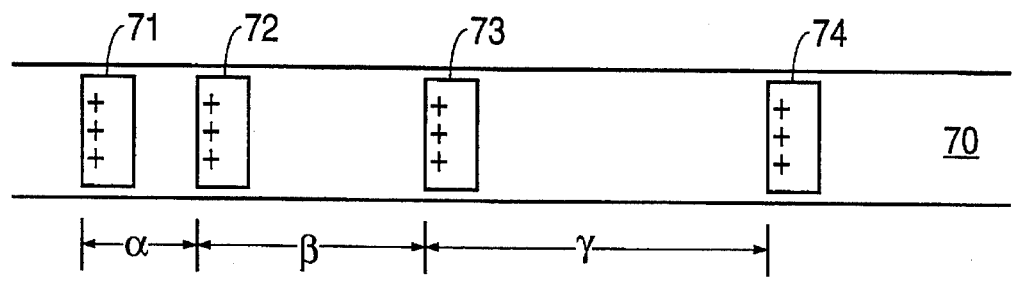
FIG. 7 illustrates an arrangement of recesses which represent ROM data.

In another embodiment according to the invention, recesses similar to those described above are used to store ROM data or header information other than track alignment information, such as track addresses and synchronization marks. FIG. 7 illustrates a series of recesses 71, 72, 73 and 74 in a data track 70. The spacing ($\alpha$, $\beta$, $\gamma$) between the positive magnetic poles at the leading edges of recesses 71–74 represents encoded data, and can be read by appropriate reading circuitry. While recesses 71–74 are symmetrical about the centerline of track 70, there may be applications where this is not necessary or desirable. Typically, the ROM data are placed in the data sectors of the disk (e.g., data sectors 65, 66, 67 and 68 shown in FIG. 6), while the header information is placed in the header sectors 61, 62, 63 and 64.

The recesses in the substrate may be formed in several ways: the substrate may be injection molded, with the recesses corresponding to raised portions of the mold; or the recesses may be formed by a photo polymer process, or by embossing the recesses into the substrate.

Figure 8A:
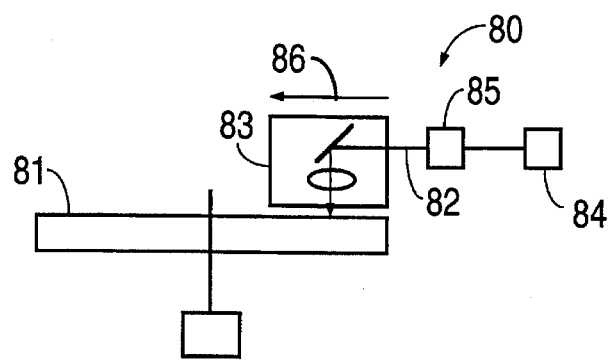
FIG. 8a illustrates conceptually a laser device for making a master disk.
Figure 8B:
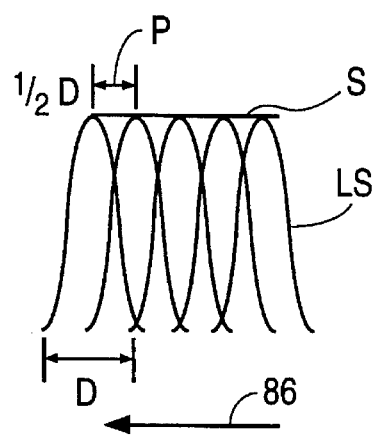

FIG. 8a illustrates conceptually a device for making a master disk which in turn can be used to produce disk substrates with many recesses. Device 80 forms marks (e.g., servo marks, clock marks, address marks and ROM data) onto a master disk 81 by means of an argon laser beam 82. Disk 81 may be a chromium photo mask or a glass disk coated with a resist resin. Laser beam 82 is focused by a lens system 83 having high N.A. (e.g., N.A.=0.93) to form a circular spot of about 0.4 micron diameter on master disk 81. The optical system moves linearly in a radial direction while placed on a moving table. The speed of the optical system should be controlled such that it moves a distance smaller than the diameter of the optical spot during one disk rotation. FIG. 8b illustrates how the intensity of laser beam 82 is summed to form a uniform exposure distribution as disk 81 is rotated. The beam intensity is controlled to form spots on adjacent tracks at the same azimuthal position. Then, the integrated value of the energy irradiated on the desired portion of master disk 81 becomes uniform. A servo mark, a clock mark, or an address mark is elongated in the radial direction of disk 81 to a length of about 1–5 microns, for example. Forming a longitudinally elongated recess 5 microns long with the optical spot having a diameter of 0.4 microns, for example, requires master disk 81 to rotate 25 times (i.e. 5/0.2=25) if the optical system moves 0.2 micron/ rotation while the beam intensity is modulated with the desired timing. Master disk 81 can be used to make large quantities of disk substrates by economical stamping.

Although a preferred embodiment and alternate embodiments of the present invention have been described in detail, the description is only an illustration or example of the invention's application and should not be taken as a limitation. Many other embodiments are possible and would be obvious to people skilled in the art after reading this disclosure.

We claim:

1. A data storage disk comprising:
    a substrate having a plurality of discrete depressions formed in a surface of said substrate, said depressions having walls and a floor, said walls extending from said surface of said substrate downward to the floor of said depressions; and
    a magnetic layer overlaying said substrate, said magnetic layer generally conforming to the discrete depressions so as to form a corresponding plurality of discrete recesses in said magnetic layer, wherein each of said recesses comprises a side wall of magnetic material covering said walls of an associated one of said depressions and extending from the floor of said depression to the surface of said substrate, a direction of magnetization in a region of said magnetic layer forming said side wall of magnetic material being parallel to a surface of said side wall of magnetic material and a direction of magnetization in a region of said magnetic layer adjacent said recesses being parallel to said surface of said substrate.

2. The data storage disk of claim 1 wherein the direction of magnetization in said region of said magnetic layer forming said side wall is upward from a bottom of said recess, thereby forming a positive magnetic pole at an edge of said recess.

3. The data storage disk of claim 1 wherein each of the plurality of recesses is offset with respect to the location of a centerline of a prospective data track on said disk.

4. The data storage disk of claim 1 wherein said recesses are formed in pairs, a first recess of each pair being offset to one side of a centerline of a prospective data track on said disk, a second recess of said pair being offset to the other side of said centerline of said data track.

5. The data storage disk of claim 4 wherein one recess of each pair of recesses is spaced from the other recess of said pair of recesses in an azimuthal direction.

6. The data storage disk of claim 1 wherein each of said recesses has a depth of from 0.03 micron to 0.05 micron.

7. The data storage disk of claim 1, said track being divided into header and data areas, each header are containing at least a pair of said recesses.

8. Structure of claim 1 wherein said magnetic material extends from the bottom of said walls of said depressions continuously to the top of said walls of depression.

9. The data storage disk of claim 1 wherein each of said recesses is elongated in a radial direction.

10. The data storage disk of claim 9 wherein each of said recesses has a longitudinal axis aligned with a radius of said disk.

11. The data storage disk of claim 10 wherein said recesses are formed in pairs on said disk, each of said pairs being designed to assist in locating a prospective data track, the distance from a center of said disk to a centerpoint of a longitudinal axis of a first recess in each of said pairs being different from the distance from the center of said disk to a centerpoint of a longitudinal axis of a second recess in each of said pairs.

12. The data storage disk of claim 11 wherein the centerpoint of the longitudinal axis of said first recess in each of said pairs is located on a first side of a centerline of said data track, and the centerpoint of the longitudinal axis of said second recess in each of said pairs is located on a second side of the centerline of said data track.

13. The data storage disk of claim 12 wherein the distance between the centerpoint of the longitudinal axis of said first recess and said centerline is approximately equal to the distance between the centerpoint of the longitudinal axis of said second recess and said centerline.

14. The data storage disk of claim 9 wherein a length of each of said recesses along a radius of said disk is from 1 micron to 20 microns.

15. The data storage disk of claim 9 wherein a width of each of said recesses perpendicular to said radial direction is from 0.5 micron to 1.0 micron.

16. A data storage comprising:

a substrate having a plurality of discrete depressions formed in a surface of said substrate; and a magnetic layer overlying said substrate, said magnetic layer conforming to the discrete depressions so as to form a corresponding plurality of discrete recesses in said magnetic layer, wherein said recesses are arranged in a stair step configuration such that the radial distance of the respective recesses from a center of the disk increases uniformly with a uniform change in azimuthal position in a particular direction.

17. The data storage disk of claim 16 wherein said recesses comprise sidewalls of magnetic material covering walls of said depressions and extending from the bottom of said walls continuously to the top of said walls, a direction of magnetization in a region of said magnetic layer forming said sidewalls of magnetic material being parallel to a surface of said sidewalls of magnetic material.

18. A data storage disk comprising:

a substrate having a plurality of discrete depressions formed in a surface of said substrate, said depressions having walls and a floor, said walls extending from said surface of said substrate downward to the floor of said depressions; and a magnetic layer overlaying said substrate, said magnetic layer conforming to the discrete depressions so as to form a corresponding plurality of discrete recesses in said magnetic layer, wherein each of said recesses comprises a sidewall of magnetic material covering the walls of an associated one of said depressions and extending from the floor of said depression to the surface of said substrate, a direction of magnetization in a region of said magnetic layer forming said sidewall of magnetic material being parallel to a surface of said sidewall of magnetic material, and a direction of magnetization in a region of said magnetic layer adjacent said recesses being parallel to said surface of said substrate, wherein an azimuthal distance between individual ones of said recesses represents ROM data.

19. Structure of claim 18 wherein said magnetic material extends from the bottom of said depressions continuously to the top of said depressions.

20. The data storage disk of claim 18 wherein said recesses when viewed from a direction perpendicular to a surface of said disk are rectangular, the azimuthal distance between an edge of different ones of said recesses representing ROM data.

21. The data storage disk of claim 18 wherein said recesses when viewed from a direction perpendicular to a surface of said disk are rectangular, the azimuthal distance between respective trailing edges of said recesses representing ROM data.

22. A data storage disk comprising:

a substrate having a plurality of discrete depressions formed in a surface of said substrate, said depressions having walls and a floor, said walls extending from said surface of said substrate downward to the floor of said depressions; and a magnetic layer overlaying said substrate, said magnetic layer conforming to the discrete depressions so as to form a corresponding plurality of discrete recesses in said magnetic layer, wherein each of said recesses comprises a sidewall of magnetic material covering the walls of an associated one of said depressions and extending from the floor of said depression to the surface of said substrate, a direction of magnetization in a region of said magnetic layer forming said sidewall of magnetic material being parallel to a surface of said sidewall of magnetic material, wherein an azimuthal distance between individual ones of said recesses represents header information.

23. Structure of claim 22 wherein said magnetic material extends from the bottom of said depressions continuously to the top of the said depressions.

24. A method of fabricating a data storage disk comprising the steps of:

forming depressions in a surface of a substrate;

applying a magnetic layer to said substrate, said magnetic layer conforming to the contours of said depressions to form recesses having walls generally perpendicular to said surface of said substrate; and applying a magnetic field having a component oriented perpendicular to said surface of said substrate to cause the magnetization direction of said magnetic layer at the walls of said recesses to orient in a direction that is generally perpendicular to said surface of said substrate.

25. The method of claim 24 further comprising applying a magnetic field oriented parallel to said surface of said substrate.

26. Method of claim 24 wherein said step of forming depressions comprises the step of forming discrete depressions in said surface of said substrate.

27. Method of using a magnetic disk, said magnetic disk comprising a substrate having depressions formed therein, and a magnetic layer formed on said substrate, said magnetic layer generally conforming to the depressions so as to form a corresponding plurality of recesses in said magnetic layer, wherein each of said recesses comprises a sidewall of magnetic material generally perpendicular to said substrate and covering an associated one of said walls of said depressions, said method comprising the step of sensing the magnetization direction in said sidewall of magnetic material.

28. A method of fabricating a data storage disk comprising the steps of:

forming a plurality of discrete depressions in a surface of a substrate;

applying a magnetic layer to said substrate, said magnetic layer conforming to the contours of said depressions to form recesses having walls generally perpendicular to said surface of said substrate; and applying a magnetic field having a component oriented perpendicular to said surface of said substrate to cause the magnetization direction in said magnetic layer at said walls to have an orientation generally perpendicular to said surface of said substrate.

* * * * *